(12) United States Patent
Hansen (10) Patent No.: US 11,318,657 B2
(45) Date of Patent: *May 3, 2022

(54) METHOD USING SEPARATING SYSTEM FOR CONTAINERS

(71) Applicant: Bernd Hansen, Sulzbach-Laufen (DE)

(72) Inventor: Bernd Hansen, Sulzbach-Laufen (DE)

(*) Notice: Subject to any disclaimer, the term of this patent is extended or adjusted under 35 U.S.C. 154(b) by 1009 days.

This patent is subject to a terminal disclaimer.

(21) Appl. No.: 15/366,058

(22) Filed: Dec. 1, 2016

(65) Prior Publication Data

US 2017/0080626 A1 Mar. 23, 2017

Related U.S. Application Data

(62) Division of application No. 12/452,283, filed as application No. PCT/EP2008/005968 on Jul. 22, 2008, now Pat. No. 10,821,650.

(30) Foreign Application Priority Data

Aug. 28, 2007 (DE) .................... 10 2007 040 472.9

(51) Int. Cl.
  *B26D 5/08* (2006.01)
  *B26D 7/18* (2006.01)
  (Continued)

(52) U.S. Cl.
  CPC ................ *B29C 49/72* (2013.01); *B26D 5/08* (2013.01); *B26D 7/18* (2013.01); *B26F 1/12* (2013.01);
  (Continued)

(58) Field of Classification Search
  CPC ..... B26D 5/08; B26D 7/18; B26F 1/02; B26F 1/12; B29C 49/72; Y10S 83/945;
  (Continued)

(56) References Cited

U.S. PATENT DOCUMENTS 2,587,076 A 2/1952 Verson et al.
2,861,486 A 11/1958 Brauer
(Continued)

FOREIGN PATENT DOCUMENTS

DE 24 44 505 4/1976
DE 38 31 957 12/1989
(Continued)

OTHER PUBLICATIONS

International Search Report (ISR) dated Nov. 18, 2008 in International (PCT) Application No. PCT/EP2008/005968.

*Primary Examiner* — Clark F Dexter
(74) *Attorney, Agent, or Firm* — Wenderoth, Lind & Ponack, L.L.P.

(57) ABSTRACT

A separating system for separating individual container products from a frame assembly of plastic material, particularly polypropylene, has at least one stamping device (36) that at least partially separates the respective container product from a frame waste. By the stamping device (36) including a free fall body (52) separating the respective frame waste from the associated container product from an initial position during free fall, the separation can be carried out with very high speed (free fall) and additional mechanical components for applying a constraint force on the stamping body during the creating of the separating line can be omitted.

16 Claims, 9 Drawing Sheets

(51) Int. Cl.
*B26F 1/02* (2006.01)
*B26F 1/12* (2006.01)
*B29C 49/72* (2006.01)
*B29K 23/00* (2006.01)
*B29L 31/00* (2006.01)

(52) U.S. Cl.
CPC ......... *B26F 1/02* (2013.01); *B29K 2023/0641* (2013.01); *B29K 2023/12* (2013.01); *B29L 2031/712* (2013.01); *Y10S 83/945* (2013.01); *Y10S 83/946* (2013.01); *Y10T 83/0577* (2015.04); *Y10T 83/2098* (2015.04); *Y10T 83/22* (2015.04); *Y10T 83/2209* (2015.04)

(58) Field of Classification Search
CPC ............... Y10S 83/946; Y10T 83/0577; Y10T 225/329; Y10T 225/371; Y10T 225/379
USPC ........... 83/50, 945, 946; 225/97, 3, 104, 103
See application file for complete search history.

(56) References Cited

U.S. PATENT DOCUMENTS

| | | |
|---|---|---|
| 3,334,580 A | 8/1967 | Smith |
| 3,514,299 A | 5/1970 | Thanhauser |
| 3,713,944 A | 1/1973 | Dennis |
| 3,956,058 A | 5/1976 | Wemhoener |
| 4,357,294 A | 11/1982 | Hetherington et al. |
| 4,730,761 A | 3/1988 | Spano |
| 4,921,154 A | 5/1990 | Abe et al. |
| 4,952,264 A * | 8/1990 | Knape .............. B29C 51/14 156/164 |
| 5,249,492 A | 10/1993 | Brown et al. |
| 5,322,202 A | 6/1994 | Pelletier |
| 6,070,507 A | 6/2000 | Mihalov et al. |
| 2005/0000331 A1 | 1/2005 | Ferrell et al. |

FOREIGN PATENT DOCUMENTS

| | | |
|---|---|---|
| DE | 38 32 566 | 4/1990 |
| DE | 199 26 329 | 12/2000 |
| DE | 103 23 335 | 12/2004 |
| DE | 103 47 907 | 5/2005 |
| DE | 103 47 908 | 5/2005 |
| DE | 10 2004 004 755 | 8/2005 |
| EP | 0 359 971 | 3/1990 |

\* cited by examiner

METHOD USING SEPARATING SYSTEM FOR CONTAINERS

REFERENCE TO RELATED APPLICATION

This application is a divisional application of U.S. patent application Ser. No. 12/452,283, filed Dec. 23, 2009, the entire subject matter of which is hereby incorporated by reference.

FIELD OF THE INVENTION

The invention relates to a separating system for separating individual container products from a frame assembly of a plastic material, particularly of polypropylene. The device has at least one stamping device which at least partially separates the respective container product from the frame waste.

BACKGROUND OF THE INVENTION

The prior art (DE 199 26 329 A1) discloses methods and devices for producing container products of plastic, as they are supplied to a generic separating device used for separation of the pertinent individual container products from a frame assembly using a cutting or stamping device. To produce the respective container product, a tube of plasticized plastic material is extruded into a molding device, one end of the tube is sealed by welding and it is widened by producing a pneumatic pressure gradient which acts on the tube. The container is formed by being applied to the molding wall of the molding device having two opposite molding tools. By a corresponding filling mandrel, the plastic container then is filled under sterile conditions within the molding device. After removal of the filling mandrel, the container is then hermetically sealed with the formation of a definable head geometry for forming the actual plastic container in which the fluid is stored. Two container shaping jaws can be moved toward one another by hydraulic drives for obtaining the closed position and can be moved away from one another in opposite directions into one of their opening positions. To achieve very high output rates of container products, DE 103 23 335 A1 describes a multi-station arrangement. By distributing various shaping steps among different stations located in succession on an imaginary arc, a type of carousel arrangement is formed which enables very high cycle frequency for the plastic material to be outputted in the form of container products.

Since the charge to be added to the respective container product is often very susceptible to ambient media, especially when it is a highly sensitive pharmaceutical, in the prior art the focus is on, for example, covering the fill opening of the container tube at least from its formation to filling of the pertinent container in a sterile space by a sterile barrier. Very good results can be achieved when, as shown in DE 10 2004 004 755 A1, a sterile medium forms the indicated barrier in the direction of the container fill opening using a medium conveyance device in order to further improve sterility. Another or additional measure for increasing sterility simply is to provide higher processing temperatures, for example, in the production of the tubing for the container products or while the charge is being added. An increased processing temperature is limited when the often used plastic material, such as polyethylene, is temperature-sensitive, which can be otherwise very easily processed in the pertinent production devices and, accordingly, is preferred.

Otherwise, in addition to atmospheric oxygen, other gases can diffuse later on through the thin polyethylene wall into the interior of the container during the storage and sale of the container product which has been produced under sterile conditions and can damage the sensitive container contents or even make them unusable.

In order to remedy this latter disadvantage, in the prior art, production processes for these container products have already been proposed (DE 103 47 907 A1 and DE 103 47 908 A1), which relate to so-called co-extrusion production processes in which the container is built up from several layers of plastic materials. Often at least one of the layers is used as a blocking layer. Five and more layers, for example, formed from polyethylene and low density polyethylene as well as copolymers (ethylene-vinyl alcohol copolymer) can form the multilayer container wall which in this case then forms an effective blocking layer. However, these processes are costly in practical implementation. This cost makes the respective container product correspondingly more expensive.

If the individual container products come filled from the respective production machine, they are in the form of an ampule block in which several successive ampules or containers have a common wall as a block assembly or frame assembly. In order to detach the containers or ampules from the block assembly or frame assembly, they are cut out or punched out along edge zones, with a certain amount of frame waste being formed, which waste can be recycled using modern techniques. DE 38 31 957 discloses a method of producing plastic hollow container products which are present first as an ampule block or frame assembly, where in one edge zone of the frame waste, an additional hollow body is molded in the frame assembly. This hollow body increases stability in the frame assembly and, among other things, helps facilitate separation from the container product of the frame waste by the separating device being used respectively.

SUMMARY OF THE INVENTION

An object of the invention is to provide an improved separating device for separating container products at high speed, regardless of their type of plastic material, from the frame assembly with a high degree of operating reliability and relatively low production costs.

This object is basically achieved by a separating device where the stamping device of the separation device has a free fall body. From the initial position, in free fall the free fall body separates the respective frame waste from the respective container product. Separation can be effected with very high speed (free fall). Additional mechanical components for applying a positive force to the stamping body in the preparation of the separation line can be omitted. Ultimately, the free fall body need only be raised again and again. This raising, for example, can take place by means of a pneumatic working cylinder, proceeds quickly and requires little energy.

In particular, with the separating device according to the invention, polypropylene as the wall material can be used for container products. This plastic material is rather brittle compared to polyethylene material and can be worked only with difficulty using conventional stamping and cutting devices for container separation. If conventional separating devices are used, it has been found that with respect to the very high processing temperatures of polypropylene, it would be necessary to wait several minutes until the stamping or cutting process is possible at all. This delay necessarily leads to the requirement of very long retaining distances and/or additional cooling means for the container products to be separated to be able to effect separation without waste at all. As a result of the free fall body of the stamping device, clean separation can take place without these waiting times or ancillary cooling means. This separation is done by the respective container product being simply knocked off the still very warm or hot frame assembly with high speed by the free fall body with its projecting stamping surfaces. For one with average skill in the art in the field of such separating devices, it is surprising that with relatively bluntly kept stamping cutting edges which need not be further worked (ground) or maintained, separating stamping lines are achieved that was not possible using the devices in the prior art.

The advantage of using polypropylene material instead of polyethylene or a coextruded multilayer composite consisting of LDPE/MDPE is that the polypropylene material can be autoclaved at high temperatures (121° C.). The polypropylene material from only one extrusion head can be obtained at a much lower cost than the described multilayer systems. Thus, ultimately any individual layer to be produced in a multilayer system requires its own extrusion head in the production machine. This requirement increases production cost accordingly in terms of the control side as well.

If the separating device according to the invention with the stamping device and free fall body is used for polypropylene material, this application is not limited thereto. Rather, there are a plurality of possible applications here. The separating device according to the invention can also be used for other plastic materials such as polyethylene or plastic multilayer systems for separation of a container product as necessary.

In one especially preferred embodiment of the separating device according to the invention, the card-shaped frame assembly with the individual container products provides for division into a head part and bottom part. Each of the pertinent parts is assigned its own stamping device which are arranged in succession along a transport line for the frame assembly. The individual separation of the head part and bottom part allows even large format cards of the frame assembly to be "worked", with the separating device and cutting allowing the respective mass of the free fall body of the stamping device to be reduced. Another advantage in separation is keeping the stamping device for the head part unchanged for each frame assembly size, while the stamping device for the respective bottom part of the frame assembly is changed depending on how large the ampule body is in terms of its length depending on the amount of fluid to be held. In this way, adjustment efforts for the separating device can be reduced if different types or quantities of container products are to be separated from the frame waste using the separating device. Of course, the base part can also be retained and the head part changed if this is necessary.

Advantageously, the material flow for the card-like frame assembly (ampule block) to the respective stamping device is improved by transfer devices located in succession in the transport line in addition to at least one pivoting device. In this way, the output rate for the separating device is increased.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
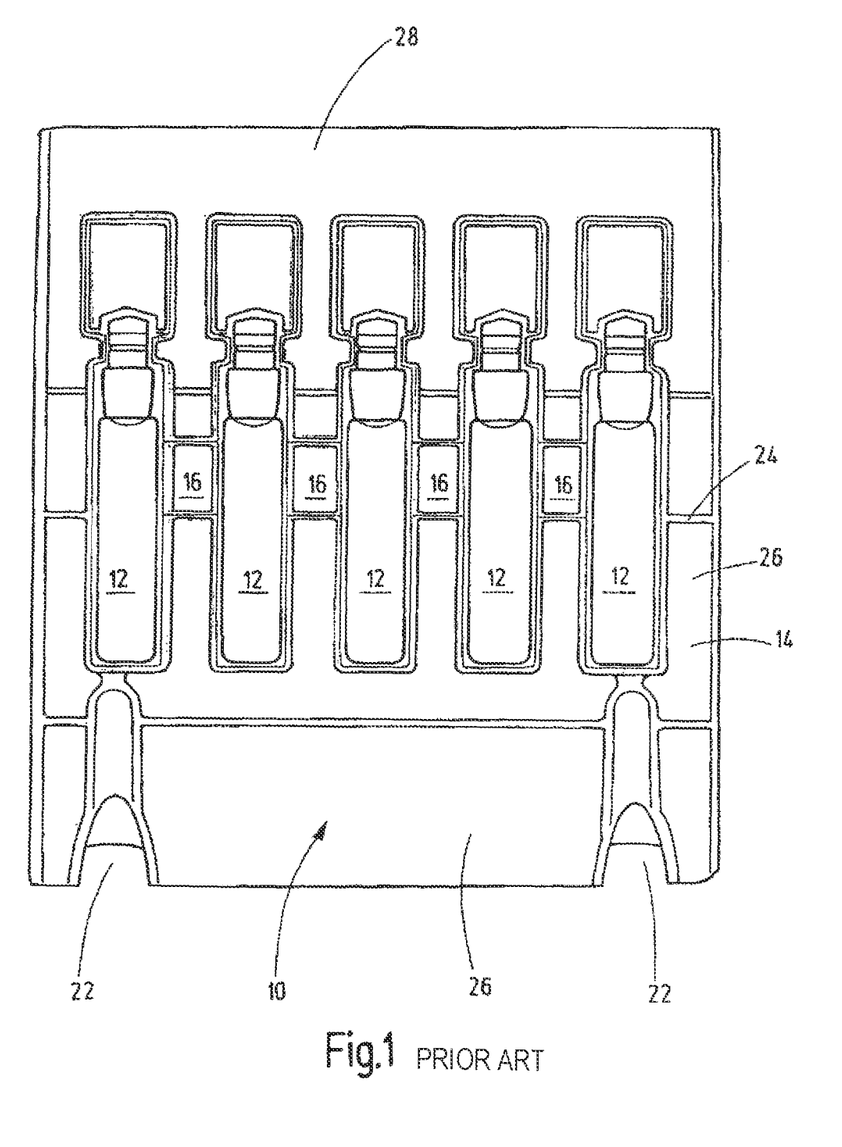
FIG. 1 is a face-side, top plan view of an actual ampule block and the frame waste of a frame assembly.
Figure 2:
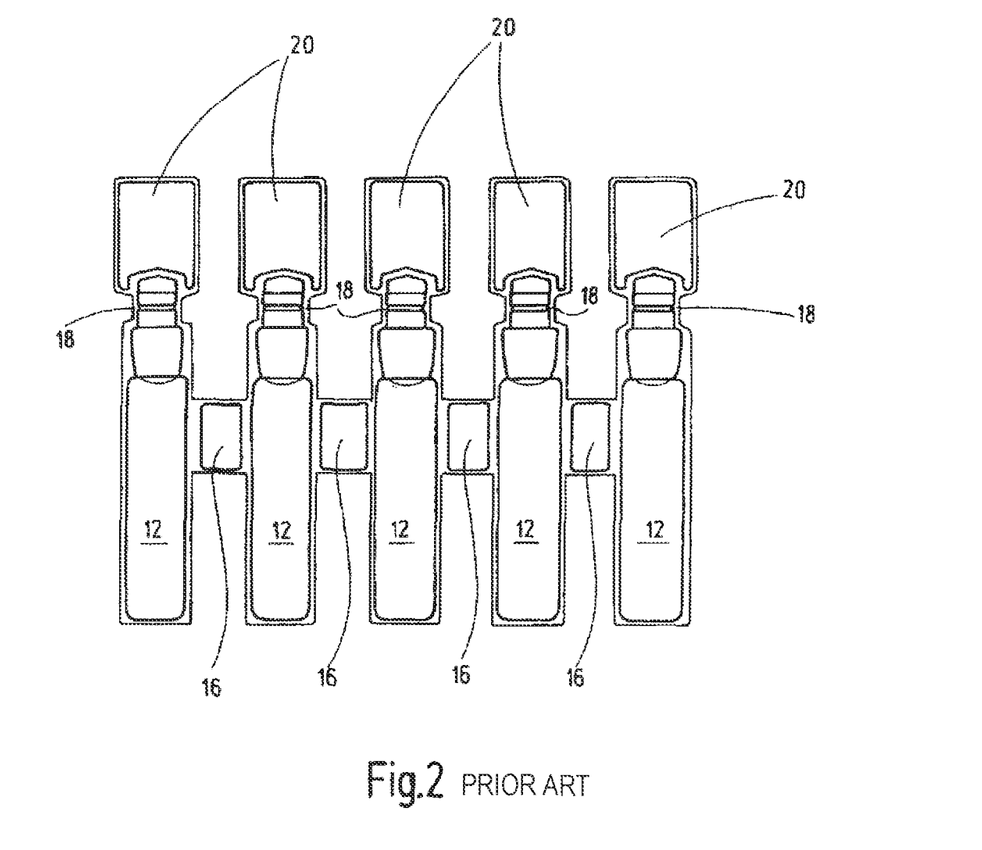
FIG. 2 is a top plan view of an ampule block removed from the frame waste of the frame assembly of FIG. 1, in which the individual container products with intermediate wall webs are detachably connected to one another as a commercial unit.

The frame assembly 10 shown in the figures is formed of a plastic material, in this case, of a polypropylene material. The frame assembly 10 is composed essentially of the actual container products 12 together with the frame waste 14 which is to be separated from the actual container products 12. When the container products 12 are separated from the frame waste 14, an ampule block from which the frame waste 14 has been removed as shown in FIG. 2 results for this purpose. The individual containers 12 or individual ampules 12 are connected to one another by way of the remaining intermediate wall webs 16 of the frame waste 14. The intermediate wall webs 16 make it possible for the respective container product 12 to be separated from the other containers 12 which remain in the block in the manner of a twist-off motion.

The respective container product 12 is known in the prior art, and the above described ampule block solution is described, for example, in DE 38 31 957 C1. The basic shape shown in FIGS. 1 and 2 constitutes only one type of an embodiment. In particular, the container geometries can be specified on the user side within a widely drawn scope. To release the container contents, usually in the form of a fluid which has been added beforehand, a twist-off cap 18 is used and it can be separated from the container product otherwise by way of the corresponding scoring via a grip 20, likewise in the manner of a twist-off motion, with the result that the fluid can be removed by way of the cleared container opening. Other container opening solutions such as dropper caps can likewise be implemented.

On the bottom of the frame assembly 10, as shown in FIG. 1, blind holes 22 are made. Using pins of a transport device (not shown) which engage the blind holes 22 on the bottom edge of the frame waste 14, the frame assembly 10 of the container products 12 and the frame waste 14 is removed from the tool of a production machine (not detailed). Due to the high stability of the frame waste, owing to a waste edge zone which is self-contained in its form, removal is then reliably and easily possible even when the plastic of the frame assembly 10 has not yet completely cooled. This respective configuration is conventional so that it will not be further detailed here.

As FIG. 1 furthermore shows, the frame waste 14 is divided in two along at least one separating line 24, this division taking place in the production machine (not shown). The bottom-side frame waste 26 can be removed separately from the head-side frame waste 28 with the result that, in this embodiment, intermediate wall webs 16 between the container products 12 remain with the formation of a retail unit. The illustrated solution can, however, also be modified such that overall the frame waste 14 is removed in such a way that individual container products 12 form the respective retail unit without still being connected to one another. The configuration is chosen at the discretion of the user.

Figure 3:
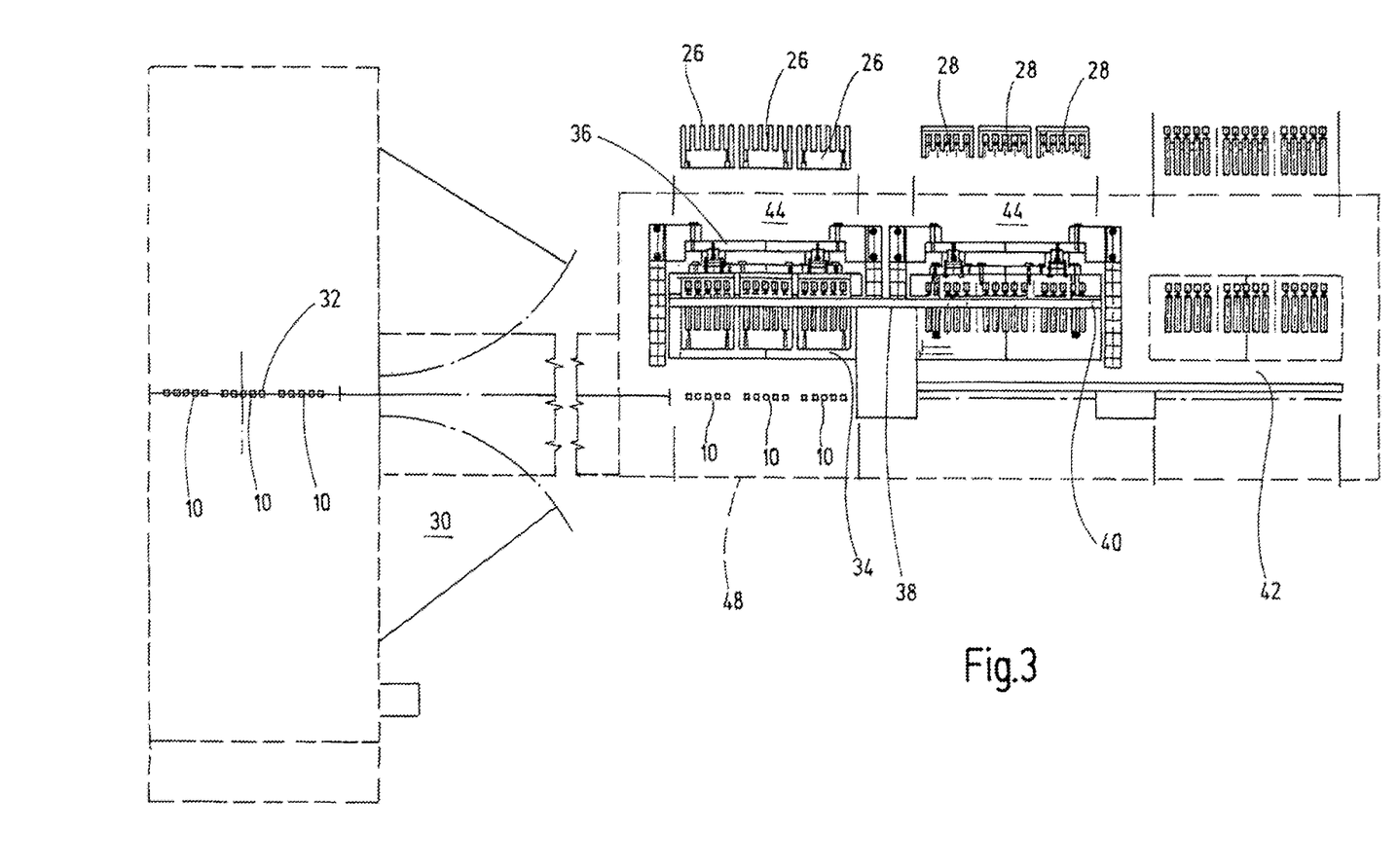
FIG. 3 is a top plan view of a schematic of the transport line or conveyor line for the ampules or containers produced by a production machine with the successively arranged stations of the separating device according to an exemplary embodiment of the invention.
Figure 5:
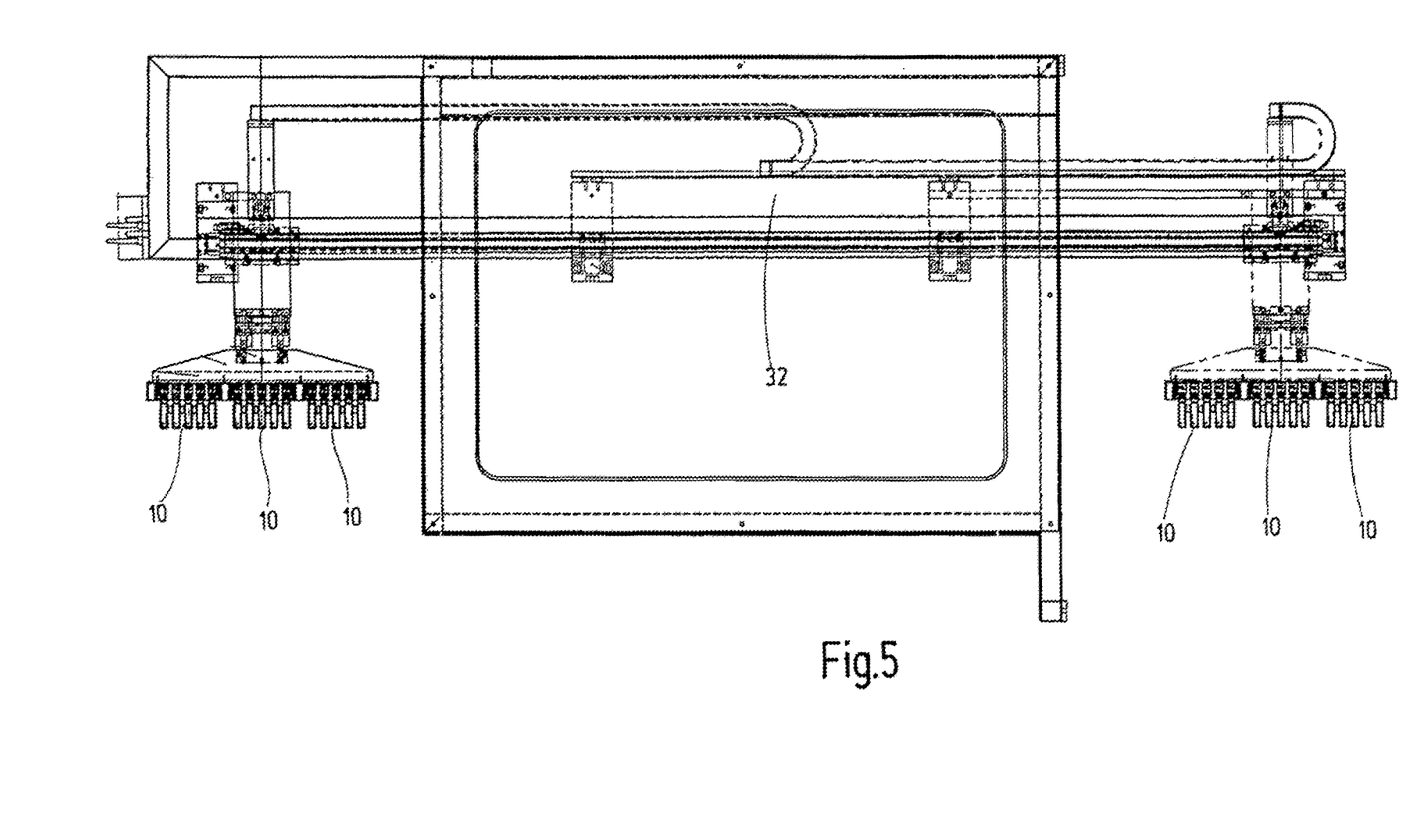
FIG. 5 is a top plan view of a first transfer device of the transport line of FIG. 3.

FIG. 3 shows, as a schematic and in a top view, the individual stations of the separating device as a whole. Viewed in the direction of FIG. 3, at extreme left, the exit region 30 of a production machine for producing the frame assembly 10 is shown, this production machine, for example, being described in DE 103 23 335 A1 so that it will not be detailed here. A first transfer device 32 which is shown in FIG. 5 in essential outlines retrieves three units of the frame assembly 10 from the production machine at the same time and transports them to a pivoting device 34 shown in FIG. 6.

Figure 8:
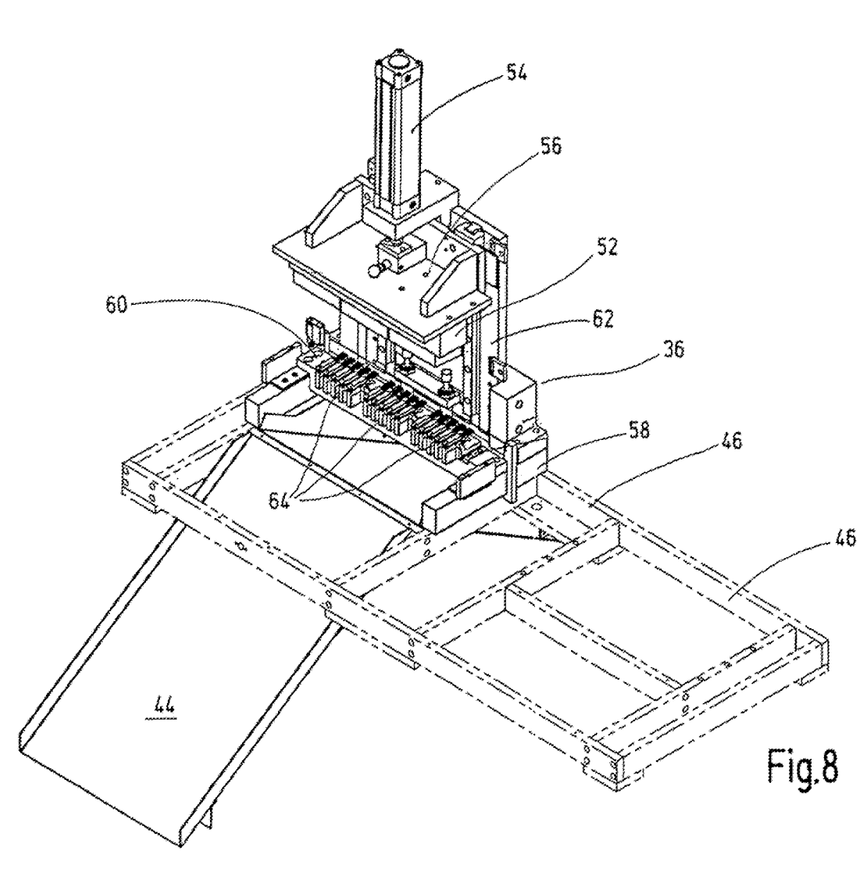
FIG. 8 is a perspective view of a module-like first stamping device of FIG. 3.
Figure 9:
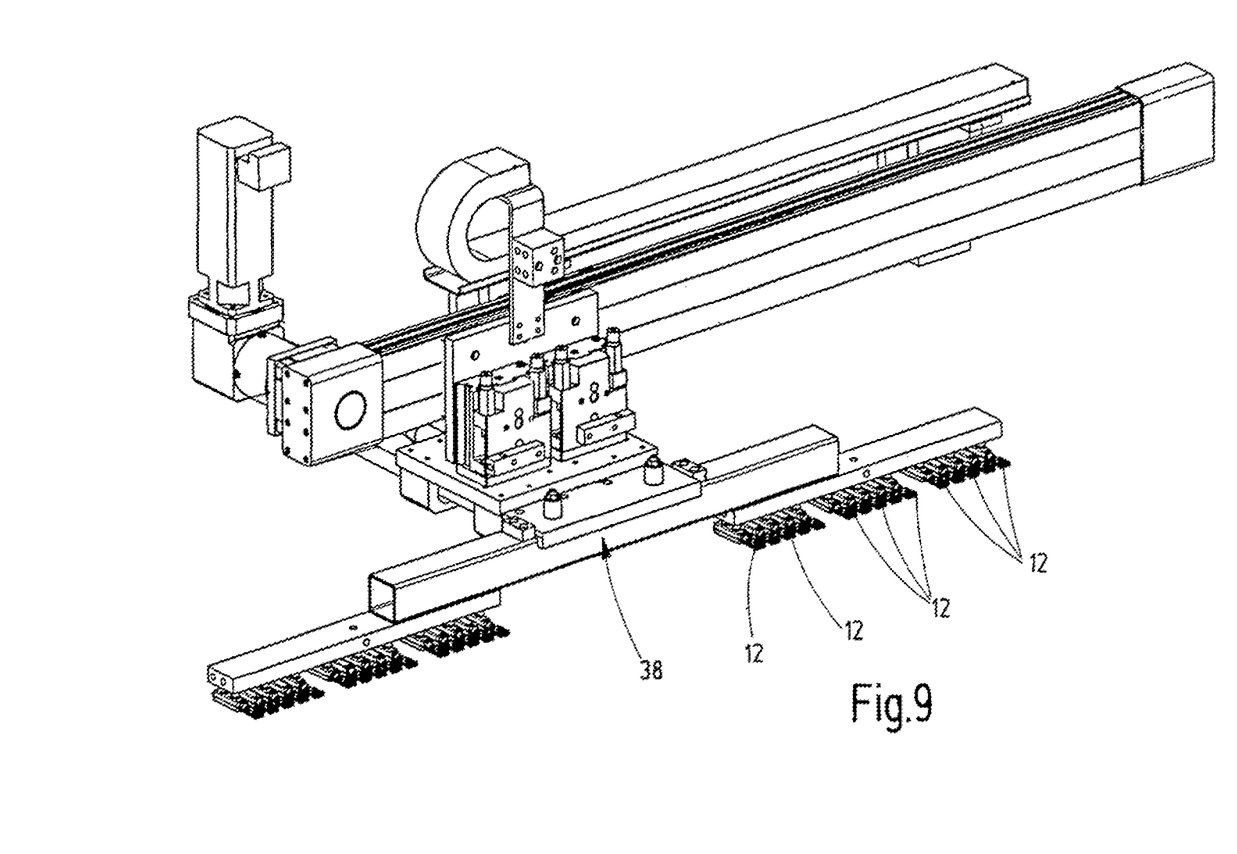
FIG. 9 is a perspective view of a second form of the transfer device of FIG. 3.

This pivoting device 34 places the three frame assemblies 10 in a first stamping device 36 as shown in FIG. 8. By this first stamping device 36 the bottom-side frame waste 26 is separated from the respective frame assembly 10. Then, the respective frame assembly 10, still including of the container products 12 and the head-side frame waste 28, as well as the intermediate wall webs 16 as shown in FIG. 9, is removed by a second transfer device 38 from the first stamping device 36 and supplied to a second stamping device 40, as is detailed in FIG. 10. Instead of the illustrated triple frame assembly 10, individual ampules 12 with the frame waste surrounding them or some other definable number of interconnected ampules 12 could be worked with the separating device according to the invention.

The second stamping device 40 then separates the head-side frame waste 28 from the remaining frame assembly, as described. The container assembly as shown in FIG. 2 is transferred in turn in the triple arrangement by the second transfer means 38 from the second stamping device 40 for further delivery to a removal station 42 (compare FIG. 3). The product, which has been obtained in this way, can then be placed in conventional packaging for commerce by suitable devices (not shown). FIG. 3 therefore shows in rough outlines how the transport line runs, proceeding from the production machine located at left viewed in the direction of FIG. 3 with its output region 30 which is connected to the first stamping device for bottom-side frame waste 26 and then the second stamping device 40 for the head-side frame waste 28. For correspondingly small container products, one stamping device can also be sufficient to separate the frame waste 14 in its entirety from the respective frame assembly 10.

The stamping sequence can also be reversed such that first the head-side frame waste 28 is removed, and then the bottom-side frame waste 26 in the direction of the described transport line is removed. Only the embodiment shown in FIG. 3 has the advantage that the length of the container product 12 and therefore the filling volume can be changed without the geometry of the head side of the container product 12 changing. Depending on the ampule length, the first stamping device 36 which is the left one viewed in the direction of FIG. 3 can be changed on the bottom side from its stamping tools. The indicated waste products 26, 28 can be removed from the separating device by the corresponding removal bevels 44 on the first stamping device 36 and the second stamping device 40.

Figure 4:
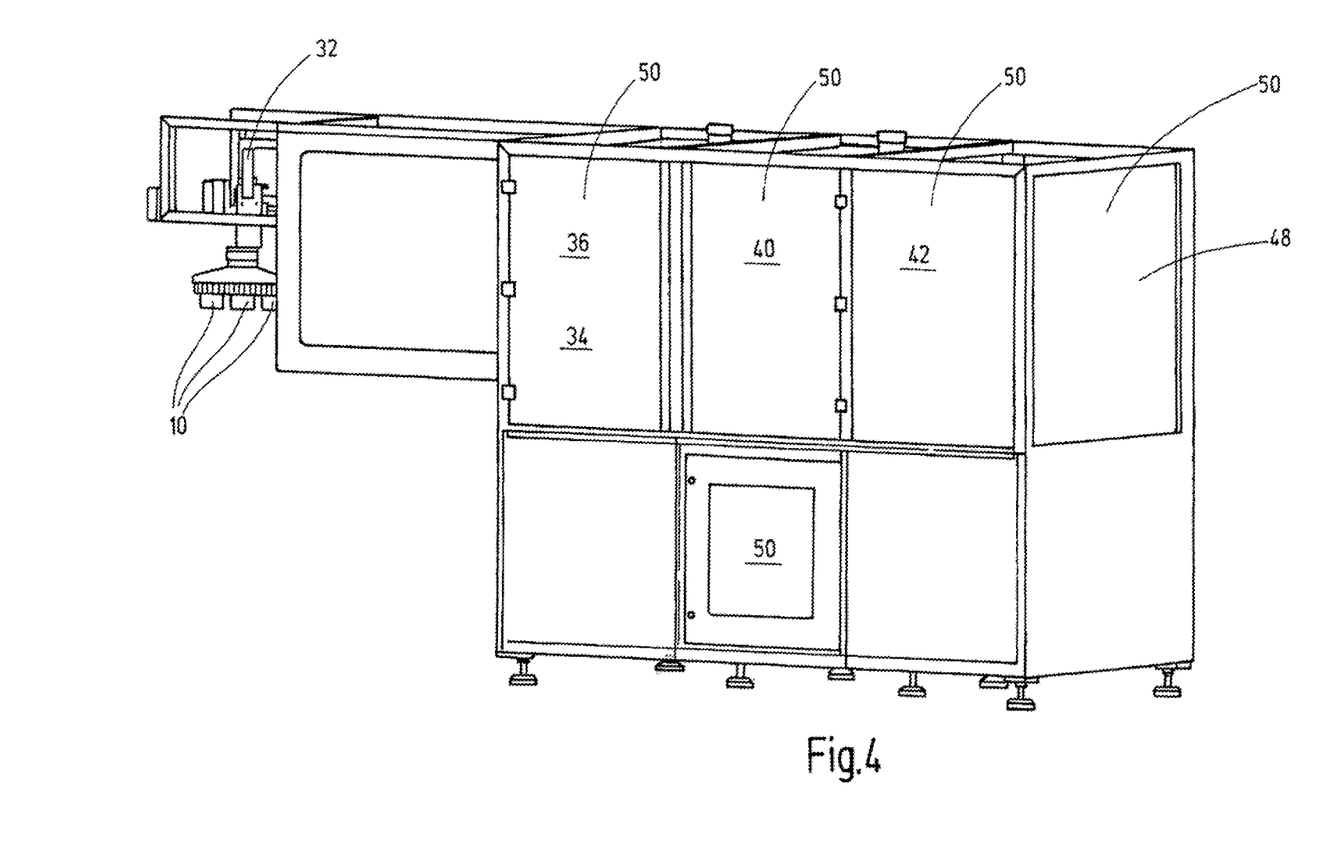
FIG. 4 is a perspective view of a housing arrangement for holding the individual stations as shown in FIG. 3.
Figures 6, 7:
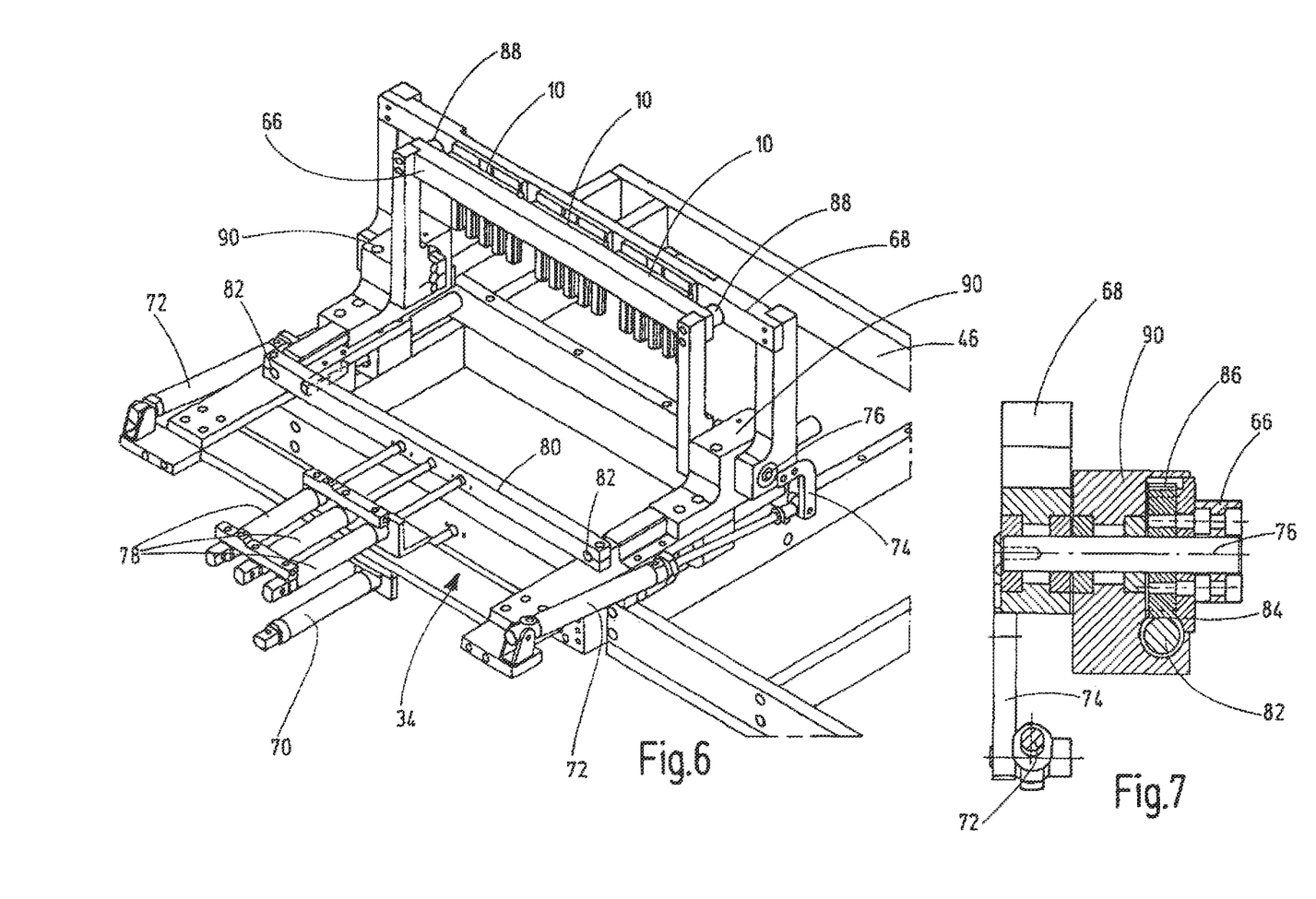
FIG. 6 is a perspective top view of a pivoting device for inserting the container products into a first stamping device of FIG. 3.
FIG. 7 is a partial side elevational view in section of the left-hand support of a frame assembly of the pivoting device viewed in the direction of FIG. 6.
Figure 10:
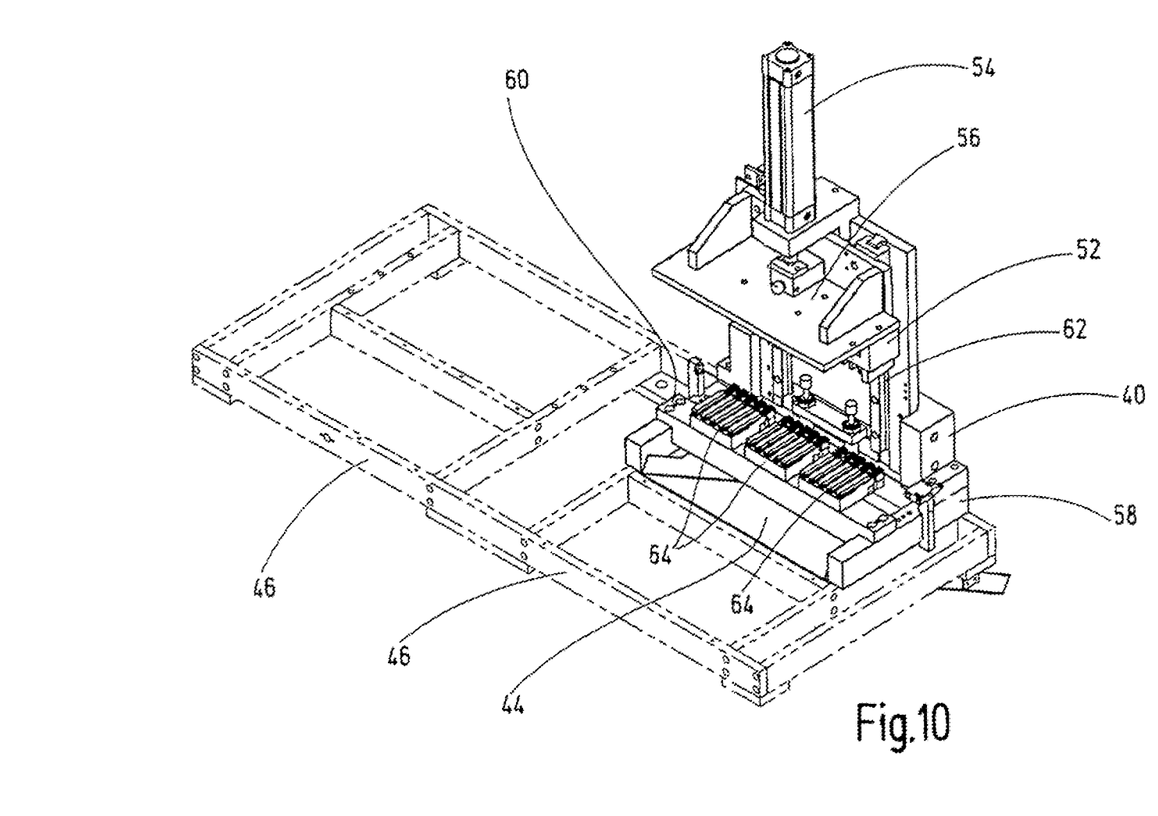
FIG. 10 is a perspective view of the module-like structure of another second stamping device.

This separating device, as illustrated particularly in FIGS. 6, 8, and 10, is made modularly using individual modules 46 which can be easily replaced for maintenance and assembly purposes. For a production machine output with altered shapes for the frame assembly 10, the correspondingly modular configuration of the stamping and transfer devices and of the pivoting device can be adapted to the altered product. The cabinet-shaped housing structure 48 of the separating device shown in FIG. 4 also takes into account this modular nature, and one station is assigned to each easily accessible cabinet part. In order to enable a clear view of the respective station of the separating device, specifically that part of the housing structure 48 which is the top part, viewed in the direction of FIG. 4, can have glass wall segments 50.

The respective stamping device as shown in FIGS. 8 and 10 each has a respective free fall body 52 which is intended to have a high free fall mass, for example, on the order of fifty and more kilograms. On the bottom of the respective free fall body 52 are strip-shaped separating bodies (not shown) which are kept relatively blunt and which separate the frame waste 14 from the actual container products 12 in the indicated two steps. Viewed in the directions of FIGS. 8 and 10, the free fall body 52 shown in its upper initial position is able to fall vertically from its initial position into the separating or stamping position, viewed in the direction of the figures. A lifting device 54, for example, in the form of a pneumatic cylinder, is then in turn able to quickly retrieve the fallen free fall body 52 from the stamping or separating position into the initial position shown in FIGS. 8 and 10. For this purpose, the free fall body 52 is coupled to a falling plate 56 on which the pneumatic cylinder acts with its piston rod.

As FIGS. 8 and 10 furthermore show, the respective stamping device 36, 40 is provided with an angle-shaped base body 58 along whose horizontally arranged base part 60 the respective frame assembly 10 is guided and extends parallel to the free fall body 52. Free fall body 52 is guided via at least one lengthwise guide 62 on the vertically extending part of the base body 58. The respective base part 60 of the stamping devices 36 and 40 each has individual receivers 64 for three ampule block arrangements to be held at a time. The respective individual receiver 64 of the first stamping device 36 as shown in FIG. 8 is designed such that the container products 12 on their head part are held with the twist-off closure in the individual receiver 64 and with the region of the actual container containing fluid as shown in FIG. 1, allowing the bottom-side frame waste 26 to be removed.

In the other stamping device 40 as shown in FIG. 10, the conditions are reversed. The container product 12 is then held in the region of the actual container receiver. In the head-side region, the respective container product 12 is guided in the individual receiver 64 such that the separating body of the free fall body 52 can remove the head-side frame waste 28. In correspondence with the number of container products 12 in the frame assembly 10, in this embodiment there are always five pressure pads on the head or bottom side for the individual receiver 64. The individual receivers 64 can be easily replaced so that any machine downtimes can be kept short for modification measures or in case of wear.

In order to be able to ensure material transport within the transport line, as already shown, different types of transfer and pivoting devices are used. The transfer devices which are shown in FIGS. 5 and 9 and which once vertically transport the respective frame assembly 10 and then horizontally transport the at least partially stamped out ampule block, are of conventional design and are not detailed here for that reason. The first transfer device 32 as shown in FIG. 5 retrieves the respective frame assembly 10 which has been completed by the production machine and moves it to the pivoting device 34 as shown in FIG. 6. There the frame assembly 10 which have been transported by the first transfer device 32 are transferred to the pivoting device 34 and two pivotable frame parts 66 and 68 clamp the respective frame assembly 10 securely between each other and are transferred, in this case, viewed in the direction of FIG. 5, from the first transfer device 32 in the right travelling position, the simultaneously shown left travelling position corresponding to the removal mode on the production machine.

To insert the respective frame assembly 10 into the assignable individual receivers 64 of the first stamping device 36, with the individual working cylinder 70, which is the lower one viewed in the direction of FIG. 6, the frame parts 66 and 68 can be jointly moved horizontally in order in this way to execute a horizontal feed motion to the first stamping device 36. Furthermore, the two frame parts 66, 68 with the frame assembly parts clamped between them can be moved out of the acceptance position which is vertical when viewed in the direction of FIG. 6 by two pivoting cylinders 72 into the horizontal insertion position in which the respective frame assembly 10 is then inserted into the assignable individual receiver 64.

If the respective pivoting cylinder 72 is then retracted, the frame part arrangement 66, 68 viewed in the direction of FIG. 6 is moved clockwise around the pivoting axis 76 by way of one offset pivoting lever 74 which can be assigned at a time. When the frame part 68 at least comes to rest in its horizontal position within the first stamping device 36, the overlying frame part 66 must be pivoted back counterclockwise in order in this way to release the respective frame assembly 10 in the first stamping device 36 for free fall motion of the free fall body 52 with the stamping device strips located right at the bottom. For the pertinent resetting motion there are three working cylinders 78 and they act on a common connecting rod 80 which passes on the edge side into one transverse connecting rod 82 at a time which, thus intermeshing with teeth 84 (FIG. 7), engages a gear arrangement 86 which, regardless of the actuating state of the pivoting axis 76, allows the frame part 66 located right at the front, viewed in the direction of looking at FIG. 6, to pivot back.

For the feed motion of the frame part 66 to the vertically positioned frame part 68 as shown in FIG. 6, in order to clamp the frame assembly which has been delivered with the first transfer means 32 in a triple arrangement, the working cylinders 78 jointly retract and the frame part 66 is thus pivoted counterclockwise in the direction of the frame part 68. In the process, the common connecting rod 80 to which the working cylinders 78 are coupled on the face side with their actuating pistons entrains the two transverse connecting rods 82 which are located at a right angle on the edge side and which when viewed in the direction of FIG. 7 are extended perpendicular to the plane of the figure in the direction of the viewer. In doing so, gear arrangement 86 moves clockwise in the pivoting direction. In the extension motion of the individual working cylinders 78, the frame part 66 is folded back against the aforementioned pivoting direction and, accordingly, clockwise in the direction of the connecting rod 80 which extends transversely thereto. Furthermore, as shown in FIG. 6, there are damper elements 88 on the frame part 66 which damp the striking of the frame part 66 against frame part 68 and form a type of gap boundary for the clamping head-side receiver of the respective frame assembly 10.

With simultaneous retraction motion of the working cylinders 78 and of the pivoting cylinders 72, the two frame parts 66, 68 then move clockwise clamped to one another toward the first stamping device 36 for the transfer process. The pertinent pivoting transfer motion can still be coupled to the axial lengthwise travelling motion of the overall carriage or frame arrangement by way of the individual working cylinder 70 which then travels in the direction of the first stamping device 36. Essentially, FIG. 7 shows a lengthwise section through the receiving block 90 which is the left one viewed in the direction of FIG. 6 and which, in addition to the pivoting axis 76, also holds the gear arrangement 86 along with the transverse connecting rod 82. On the lower base end, block 9 separates the two frame parts 66, 68 from one another. The gear arrangement 86 is pivotally guided in the receiving block 90 as a pivoting sleeve and is firmly connected to the frame part 66.

The second transfer device 38 shown in FIG. 9 then retrieves from the first stamping device 36, as shown in FIG. 8, the remaining frame assembly 10 from which in this case the bottom side frame waste 26 has been removed, and inserts the pertinent parts into the assignable individual receivers 64 of the second stamping device 40 in which then the head-side frame waste 28 is removed. In the next transfer step then the finished container products 12 connected by way of intermediate wall webs 16 are deposited in the removal station 42 for packaging delivery and at the same time a new frame assembly 10 in a triple arrangement is retrieved again and the bottom-side frame waste 26 is removed from it. The second transfer device 38 as shown in FIG. 9, accordingly, works in the manner of a two-cycle arrangement with simultaneous operation of several stations.

With the separating device according to the invention, due to the modular structure, a good spatial situation arises for use of diverse transfer and pivoting devices for individual stamping machines. Due to the modular nature, simple retrofitting is achieved by clear separation of standard parts and format parts, and there remains enough space for additional options to further expand the separating device or to be able to adapt it suitably within production lines.

While one embodiment has been chosen to illustrate the invention, it will be understood by those skilled in the art that various changes and modifications can be made therein without departing from the scope of the invention as defined in the claims.

What is claimed is:

1. A method of separating frame waste from a frame assembly, the frame assembly including a container and the frame waste, the method comprising steps of:
    forming a frame assembly including a closed and sealed hollow container with a frame waste formed therewith, the frame waste at least partially surrounding the container, the frame assembly being formed of plastic material;

placing the frame assembly in a stamping device; and
separating the frame waste from the frame assembly in the stamping device, before the frame assembly cools to ambient temperature after so as to be still warm or hot relative to the ambient temperature from the forming thereof, by a first free fall body of the stamping device being moved from an initial position spaced from the frame assembly to a separating position engaging the frame assembly in a free fall movement of the first free fall body to separate the frame waste from the frame assembly, the stamping device including an angled base having a base body with a horizontally arranged base part guiding and supporting the frame assembly to extend parallel to the first free fall body and with a vertically extending guide part guiding vertical movement of the free fall body.

2. A method according to claim 1 wherein
the plastic material is polypropylene.

3. A method according to claim 1 wherein
a lifter of the stamping device moves the first free fall body from the separating position to the initial position after separating the frame waste from the frame assembly.

4. A method according to claim 1 wherein
the frame assembly is card shaped with a plurality of individual containers separating a head part and a bottom part of the frame waste; and
a separate, second free fall body, spaced in succession along a transport line from the first free fall body, moves in a free fall movement thereof relative to the respective head part or bottom part from an initial position thereof spaced from the respective part to a separating position thereof engaging the respective part to separate the respective part from the containers.

5. A method according to claim 1 wherein
a transfer device interacting with a pivoting device pivots the frame assembly from a vertical transport position into a horizontal stamping position underneath the free fall body.

6. A method according to claim 1 wherein
a first transfer device transfers the frame assembly exiting a production machine making the frame assembly in a vertical orientation to a pivoting device arranged upstream of the pivoting device in a transport line, the pivoting device pivoting the frame assembly from the vertical orientation into a horizontal orientation underneath the free fall body and having two frame parts pivotable separately from one another and clamping the frame assembly on one of a head side or a bottom side for a separating process on the other of the head side or the bottom side.

7. A method according to claim 6 wherein
a second transfer device following the pivoting device in the transport line horizontally transfers the frame assembly from which the frame waste of the one of the head side or the bottom side had been removed to a downstream stamping device having a second free fall body separating remaining frame waste from the frame assembly on the other of the head side or the bottom side.

8. A method according to claim 7 wherein
the second transfer device retrieving the frame assembly from the downstream stamping device transfers that frame assembly in the transport line to a removal station.

9. A method of separating frame waste from a frame assembly, the frame assembly including a container and the frame waste, the method comprising steps of:
forming a frame assembly including a closed and sealed hollow container with a frame waste formed therewith, the frame assembly at least partially surrounding the container, the frame assembly being formed of polypropylene plastic material;
placing the frame assembly in a stamping device; and
separating the frame waste from the frame assembly in the stamping device, while the frame assembly is still warm or hot from the forming thereof, by a first free fall body of the stamping device being moved from an initial position spaced from the frame assembly to a separating position engaging the frame assembly in a free fall movement of the first free fall body to separate the frame waste from the frame assembly;
engaging a lifter of the stamping device with the first free fall body to move the first free fall body from the separating position to the initial position;
forming the frame assembly as card shaped with a plurality of individual containers separating a head part and a bottom part of the frame waste;
moving a separate, second free fall body, spaced in succession along a transport line, in a free fall movement thereof relative to the respective head part or bottom part from an initial position thereof spaced from the respective part and a separating position thereof engaging the respective part to separate the respective part from the containers;
an angled base of the stamping device having a base body with a horizontally arranged base part guiding and supporting the frame assembly to extend parallel to the first free fall body and with a vertically extending guide part guiding vertical movement of the first free fall body;
a first transfer device transferring the frame assembly exiting a production machine making the frame assembly in a vertical orientation to a pivoting device and being arranged upstream of the pivoting device in a transport line, the pivoting device pivoting the frame assembly from the vertical orientation to a horizontal orientation underneath the first free fall body and having two frame parts pivotable separately from one another and clamping the frame assembly on one of a head side and a bottom side for a separating process on the other of the head side and the bottom side;
a second transfer device following the pivoting device in the transport line and horizontally transferring the frame assembly from which the frame waste of the one of the head side or the bottom side had been removed to a downstream stamping device having a free fall body separating remaining frame waste from the frame assembly on the other of the head side or the bottom side; and
the second transfer device retrieving the frame assembly from the downstream stamping device and transferring that frame assembly in the transport line to a removal station.

10. A method of separating frame waste from a frame assembly, the frame assembly including a container and the frame waste, the method comprising steps of:
forming a frame assembly including a closed and sealed hollow container with a frame waste formed therewith, the frame waste at least partially surrounding the container, the frame assembly being formed of plastic material;

placing the frame assembly in a stamping device;

separating the frame waste from the frame assembly in the stamping device, before the frame assembly cools to ambient temperature after so as to be still warm or hot relative to the ambient temperature from the forming thereof, by a first free fall body of the stamping device being moved from an initial position spaced from the frame assembly to a separating position engaging the frame assembly in a free fall movement of the first free fall body to separate the frame waste from the frame assembly; and a first transfer device transferring the frame assembly exiting a production machine making the frame assembly in a vertical orientation to a pivoting device arranged upstream of the pivoting device in a transport line, the pivoting device pivoting the frame assembly from the vertical orientation into a horizontal orientation underneath the free fall body and having two frame parts pivotable separately from one another and clamping the frame assembly on one of a head side or a bottom side for a separating process on the other of the head side or the bottom side.

11. A method according to claim 10 wherein
the plastic material is polypropylene.

12. A method according to claim 10 wherein
a lifter of the stamping device moves the first free fall body from the separating position to the initial position after separating the frame waste from the frame assembly.

13. A method according to claim 10 wherein
the frame assembly is card shaped with a plurality of individual containers separating a head part and a bottom part of the frame waste; and a separate, second free fall body, spaced in succession along a transport line from the first free fall body, moves in a free fall movement thereof relative to the respective head part or bottom part from an initial position thereof spaced from the respective part to a separating position thereof engaging the respective part to separate the respective part from the containers.

14. A method according to claim 10 wherein
a transfer device interacting with a pivoting device pivots the frame assembly from a vertical transport position into a horizontal stamping position underneath the free fall body.

15. A method according to claim 10 wherein
a second transfer device following the pivoting device in the transport line horizontally transfers the frame assembly from which the frame waste of the one of the head side or the bottom side had been removed to a downstream stamping device having a second free fall body separating remaining frame waste from the frame assembly on the other of the head side or the bottom side.

16. A method according to claim 15 wherein
the second transfer device retrieving the frame assembly from the downstream stamping device transfers that frame assembly in the transport line to a removal station.

* * * * *